United States Patent [19]

Sakakibara et al.

[11] Patent Number: 5,546,248
[45] Date of Patent: Aug. 13, 1996

[54] REPRODUCING APPARATUS THAT PERFORMS TRACKING CONTROL AND PHASE CONTROL FOR A SIGNAL RECORDED IN PLURAL TRACKS OF A TAPE MEDIUM

[75] Inventors: Yoshio Sakakibara, Neyagawa; Makoto Gotou, Nishinomiya; Kazuhiko Kobayashi, Moriguchi; Haruo Isaka, Yawata; Akihiko Nakamura, Osaka, all of Japan

[73] Assignee: Matsushita Electric Industrial Co., Ltd., Osaka, Japan

[21] Appl. No.: 40,983

[22] Filed: Mar. 31, 1993

[30] Foreign Application Priority Data

Apr. 3, 1992 [JP] Japan .................................. 4-081774

[51] Int. Cl.$^6$ .................................................. G11B 5/584
[52] U.S. Cl. .......................... 360/77.140; 360/22; 360/71
[58] Field of Search ............................ 360/77.14, 77.15, 360/77.13, 27, 70, 71, 22, 72.1, 9.1, 19.1, 18

[56] References Cited

U.S. PATENT DOCUMENTS

| | | | |
|---|---|---|---|
| 4,613,914 | 9/1986 | Kobori et al. | 360/70 |
| 4,814,900 | 3/1989 | Nemoto et al. | 360/10.2 |
| 4,970,612 | 11/1990 | Renders et al. | 360/74.3 X |
| 5,016,120 | 5/1991 | Okada et al. | 360/19.1 |
| 5,023,707 | 6/1991 | Briggs | 360/19.1 |
| 5,026,509 | 6/1991 | Arai et al. | 360/77.15 |
| 5,396,373 | 3/1995 | Mori et al. | 360/77.14 X |

FOREIGN PATENT DOCUMENTS

| | | |
|---|---|---|
| 0276990 | 3/1988 | European Pat. Off. . |
| 0339724A1 | 11/1989 | European Pat. Off. . |

*Primary Examiner*—Andrew L. Sniezek
*Attorney, Agent, or Firm*—Wenderoth, Lind & Ponack

[57] ABSTRACT

A reproducing apparatus reproduces information signals recorded multi-segmentally on oblique tracks on a tape. Track ID information recorded in the tracks is detected and compared with a reference frame to obtain a phase difference. The tape transportation is controlled in response to this phase difference to correct a reproduced phase so that it is made to coincide with a reference frame phase, as well as to perform tracking control using a tracking pilot signal recorded on the oblique track together with the information signal.

6 Claims, 8 Drawing Sheets

REFERENCE TRACK No.

REPRODUCED TRACK No.

|   | 0 | 1 | 2 | 3 | 4 |
|---|---|---|---|---|---|
| 0 | 0 | 1 | 2 | -2 | -1 |
| 1 | -1 | 0 | 1 | 2 | -2 |
| 2 | -2 | -1 | 0 | 1 | 2 |
| 3 | 2 | -2 | -1 | 0 | 1 |
| 4 | 1 | 2 | -2 | -1 | 0 |

REPRODUCING APPARATUS THAT PERFORMS TRACKING CONTROL AND PHASE CONTROL FOR A SIGNAL RECORDED IN PLURAL TRACKS OF A TAPE MEDIUM

BACKGROUND OF THE INVENTION

1. Field of the Invention

This invention relates to a reproducing apparatus for reproducing information signals recorded in the form of oblique tracks on a magnetic tape by rotary heads.

2. Description of the Prior Art

In case of reproducing an information signal recorded on a tape in the form of oblique tracks, a reproducing apparatus performs helical scanning by rotary heads in general. In this case, the information signal recorded on the tape is segmented track by track. For example, in a reproducing apparatus for reproducing a video signal, such as the consumer use VTR (VHS or the like), the video signal is segmentally recorded on a tape to form one track by one field and two tracks by one frame. This tape has a control (CTL) signal (one pulse per one frame) recorded on a track (linear track) formed in the lengthwise direction of the tape independently of the oblique track. This CTL signal is used during reproduction to control tracking so that each head can scan the corresponding tracks properly. In this case, the frame of the information signal to be reproduced from the tape is required to be synchronized with a reference frame signal. For example, in the pre-roll period of assembly editing, the control signal reproduced from the tape is compared in phase directly or indirectly with an external reference frame signal, and the result thus compared is reflected to the tracking control, so that the frame of the reproduced signal is synchronized with the external reference frame finally.

With the conventional reproducing apparatus as described above, since each frame is composed of two tracks which are different in azimuth from each other, the frame synchronization also can be performed simultaneously by effecting the tracking control using the tracking signal (in this case, CTL signal) without special frame information. However, if the number of tracks per frame is made larger than two, the reproduced frame cannot be synchronized with the reference frame by this method which does not have any synchronization information signal other than the CTL signal for tracking.

With a D-1 digital VTR, one frame signal is segmented into 20 to 24 tracks to be recorded on a tape. In this case, the linear track (control track) exists, and one pulse servo signal per one rotation of a drum (four tracks) and one pulse frame signal per one frame are recorded on the tape. For effecting the external synchronization, the same control as that with the consumer-use VTR described shown above may be effected using the frame signal (see, for example, journal of "Hoso-Gijutsu (Broadcasting Technologies)" Vol. 43, No. 12, 1990).

A method of effecting the tape editing using a time code in the industrial-use VTR is disclosed in U.S. Pat. No. 4663679. According to this disclosure, a time code signal showing the address of information recorded on a tape is recorded on the tape independently of the CTL signal. The reproducing apparatus compares the time code signal read out from the tape and a reference time code signal, controls the tape feeding so as to synchronize the time code signals with each other, and then executes the tracking control using the CTL signal. The time code signal shown in this example is a series of numerical information which are increased (or decreased) monotonously. On the other hand, the above-mentioned frame has a constant period. As a result, in this example, with respect to the above-mentioned problem, the objects to be synchronized with each other are different in periodicity. However, this method offers one solution to the problem.

In the conventional reproducing apparatus explained above, the information unit to be synchronized, namely, the frame signal period and the tracking signal (in the example, CTL signal) period are selected such that one becomes an integral multiple of the other. Accordingly, as seen in the consumer-use VTR shown above, when the frame signal period is equal to or smaller than the tracking signal period, the frame synchronization is attained simultaneously by effecting the tracking control. On the other hand, when the frame signal period is larger than the tracking signal period, the tracking control may be effected after the frame of the reproduced signal has been synchronized with the reference frame signal. However, if one of the frame signal period and the tracking signal period is not an integral multiple of the other, such a situation will occur in which the tracking control cannot be effected stably at the position where the frame synchronization is attained.

In addition, since both CTL and frame signals are recorded on the linear track, the reading period becomes longer, so that both the tracking control and frame phase control are difficult to carry out at a high response speed. This means that a long period of time is required to attain the frame synchronization.

SUMMARY OF THE INVENTION

An object of the present invention is to provide a reproducing apparatus capable of realizing frame synchronization without using the linear track when a signal recorded on a tape is reproduced therefrom.

Another object of the present invention is to provide a reproducing apparatus in which the time required to attain frame synchronization is reduced to realize a higher response speed primarily in the case of mode transition requiring the frame synchronizing operation.

In order to attain the above-mentioned objects, a reproducing apparatus of the present invention, for reproducing a signal recorded on a recording tape on which a signal of one frame is segmentally recorded on n oblique tracks (n is an integer satisfying $n \geq 4$) each containing therein a track number indicating a position of the track in one frame, comprises:

a tracking control loop comprising tape transporting means for transporting the recording tape in a lengthwise direction thereof, m heads ( m is an integer satisfying $n > m \geq 1$) which are disposed on a drum having the tape wound peripherally therearound for scanning the tracks on the tape by a rotation of the drum to obtain a reproduced signal, reference signal generating means for generating a reference frame signal and a reference rotation signal which is a reference of the rotation of the drum, and tracking error detecting means for detecting a positional deviation of the heads from the tracks from the reproduced signal to output a tracking error signal indicative of the positional deviation to the tape transporting means; track number detecting means for detecting a track number contained in the reproduced signal to obtain a reproduced track identifying signal indicative of the track number; frame phase difference detecting means which receives the reproduced track identifying signal and the reference frame signal for detecting a frame phase difference therebetween to obtain a frame phase difference signal indicative of the frame phase difference; and phase correcting n-leans which receives the frame phase difference signal for controlling the tape transporting means to correct a tracking position so as to eliminate the frame phase difference.

With the construction as described above, the reproducing apparatus of the present invention makes it possible to detect the frame phase difference in a short period of time without waiting for the frame boundary because the frame phase difference is detected in response to the track number contained in the reproduced signal.

In addition, the frame phase difference can be eliminated positively in a short period of time because optimum frame phase correction is carried out to eliminate the obtained frame phase difference.

Further, a series of these operations do not require the position of a linear track since the operations are carried out in response to the reproduced signal from the oblique tracks. As a result, a positional adjustment of mounting of the parts necessary for linear track reading can be eliminated, resulting in the reduction of necessary parts for signal reading. Consequently, it becomes possible to realize a reproducing apparatus which is simple in structure, low in cost and high in reliability.

In addition to the above construction, it is preferable to have polarity switching means which receives the tracking error signal and performs switching between polarity inversion and non-inversion of the tracking error signal before supplying it to the tape transporting means. The phase correcting means controls the polarity switching means to set the tracking polarity in accordance with the position after correction so as to stabilize the tracking at the tracking position after correction, so that the tracking control is accurately carried out at the position after correction even when the frame period is not equal to an integral multiple of the period of the tracking signal, thus being capable of stably synchronizing the reproduced frame with the reference frame.

DESCRIPTION OF THE PREFERRED EMBODIMENTS

Figure 1:
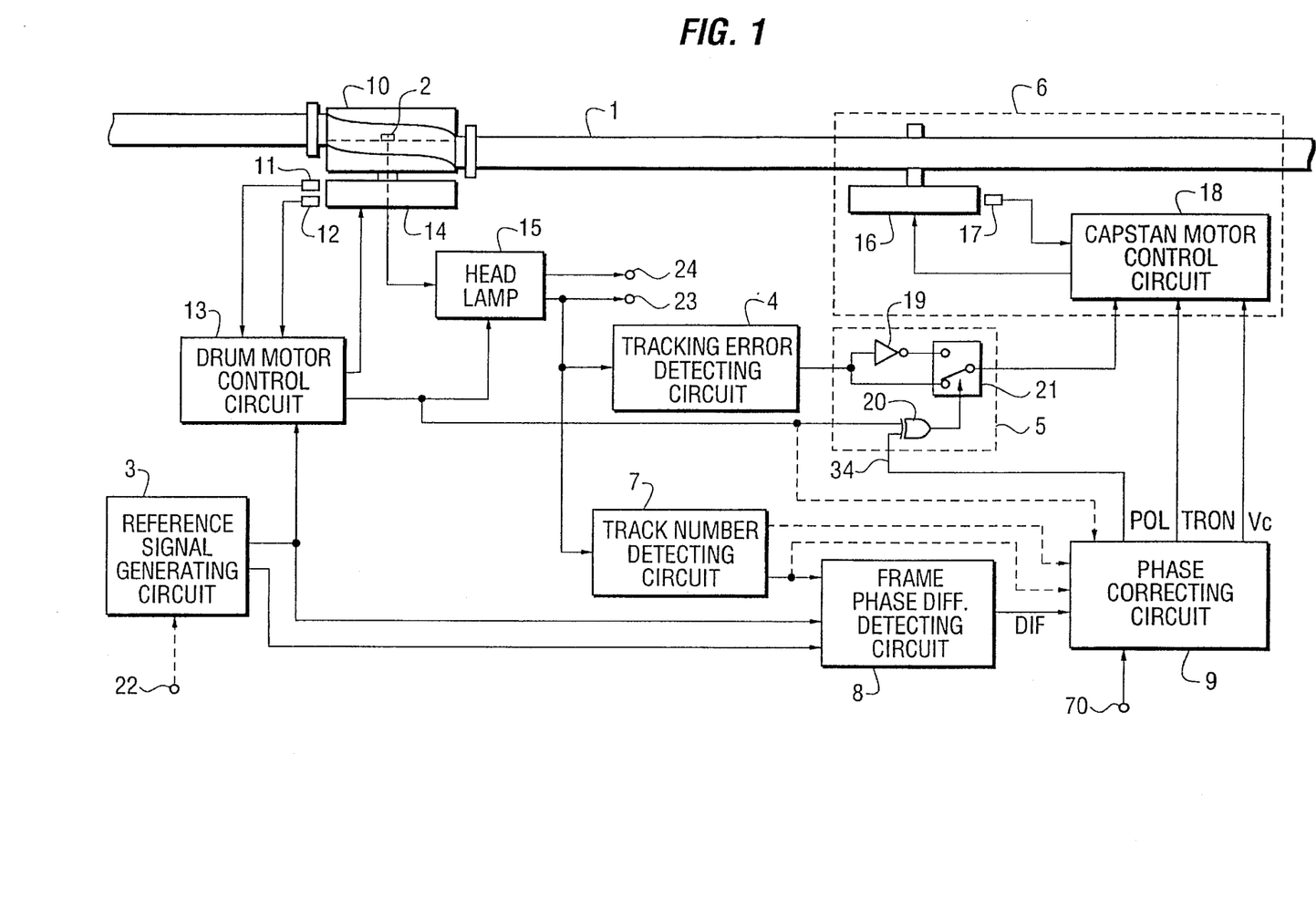
FIG. 1 is a block diagram of a reproducing apparatus according to one embodiment of the present invention.

FIG. 1 is a block diagram of a reproducing apparatus according to one embodiment of the present invention. In FIG. 1, the reference numeral 1 is a tape, 2 is a head, 3 is a reference signal generating circuit, 4 is a tracking error detecting circuit and 5 is a polarity switching circuit which is shown in broken line by a FIG. 1 and comprises an inverting circuit 19, an ex-or gate 20 and a switch 21. A block 6 shown by another broken line in FIG. 1 is a tape transporting circuit which comprises a capstan motor 16 for transporting the tape 1 in its lengthwise direction, a speed detector 17 for detecting a rotating speed of the capstan motor 16 and a capstan motor control circuit 18. Further in FIG. 1, 7 is a track number detecting circuit, 8 is a frame phase difference detecting circuit, 9 is a phase correcting circuit, 10 is a drum, 14 is a drum motor, 11 is a speed detector of a drum motor 14, 12 is a phase detector of the drum motor 14, 13 is a drum motor control circuit, and 15 is a head amplifier. The operation of the reproducing apparatus structured as above will be explained in detail.

Figure 2:
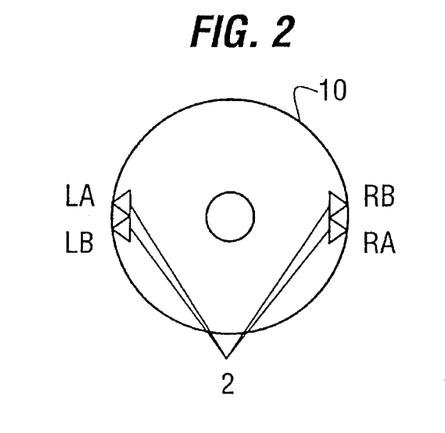
FIG. 2 is a diagram showing a head arrangement on a drum.

First, an explanation will be given regarding the signal reproduction from the tape. FIG. 2 schematically shows the head arrangement on the drum 10, in which four heads are disposed on the drum 10. Hereinafter, each head will be identified by combination of a symbol A or B showing an azimuth angle of a head gap and a symbol L or R showing a position thereof. With A and B azimuth heads as one pair, signal reproduction of two channels is carried out. On the drum 10, two pairs of A and B azimuth heads are arranged at the positions R and L so as to be positioned at a rotational angle of 180° from each other. In addition, RA and RB, and LA and LB are respectively arranged so as to be deviated in the vertical direction by an amount equivalent to a track pitch.

Figure 9:
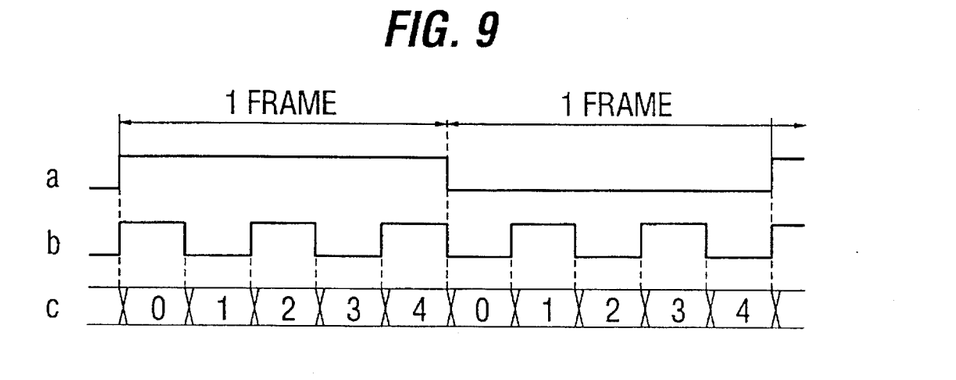
FIG. 9 is a diagram for explaining the operation of a reference signal generating circuit shown in FIG. 1.

The drum motor control circuit 13 controls the drum motor 14 to rotate at a specified rotating speed in response to the speed information from the speed detector 11. Also, the drum motor control circuit 13 switches respective heads on the drum using the rotation phase information from the phase detector 12, concretely, it generates a head switching signal (HSW) necessary for switching between LA and RA and between LB and RB. The reference signal generating circuit 3 supplies the drum motor control circuit 13 with a head switching reference signal (HSWR) showing a reference phase of the drum rotation. The reference signal generating circuit 3 also generates a reference frame signal (FRMR). The waveforms of the signals FRMR and HSWR are shown in FIG. 9a and FIG. 9b, respectively. One period of HSWR of FIG. 9b corresponds to one rotation of the drum, and half period of FRMR of FIG. 9a corresponds to one frame. The drum control circuit 13 controls the phase of the drum motor 14 so that the signals HSW and HSWR are made to coincide in phase with each other. Also, the signals HSW (not shown in FIG. 9) and HSWR are equal in waveform to each other, and also coincide in phase with each other at the time point where the phase is locked.

The head amplifier 15 amplifies signals from the four heads and performs the L/R-switching in response to the signal HSW to output to a terminal 23 (A-channel) and a terminal 24 (B-channel). The switching is made such that when the signal HSW is the high level, or HSW="H", the heads RA and RB are selected, and when the signal HSW is the low level, or HSW="L", the heads LA and LB are selected.

Figure 3:
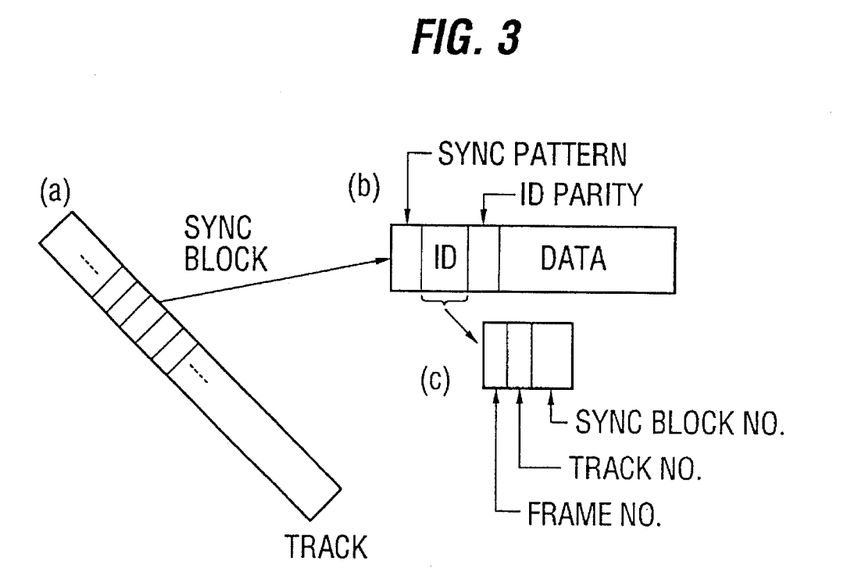
FIG. 3 is an explanatory diagram of a data structure of a track formed on a tape.
Figure 4:
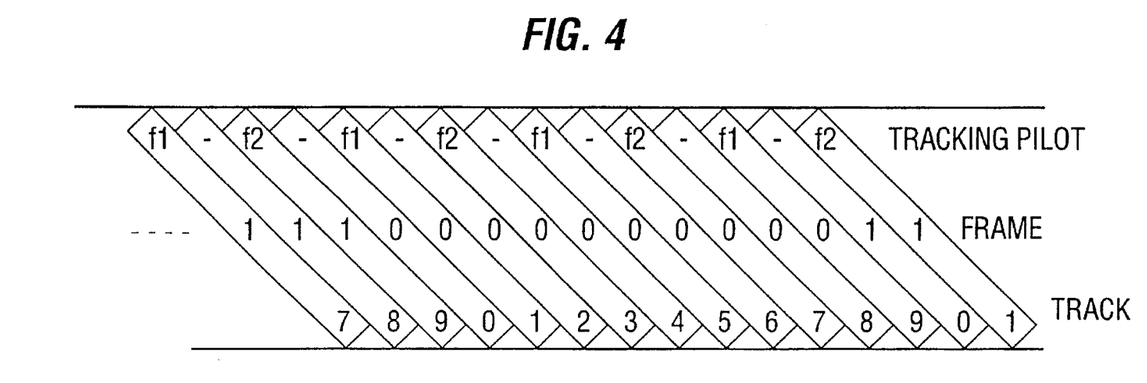
FIG. 4 is a diagram for explaining tracks formed on a tape.

Next, the tracking control operation will be explained below. FIGS. 3 and 4 show the state of the tracks being formed on the tape 1. FIG. 3 shows the recording format of a signal in one track. The signal on one track is segmented in a unit called a sync block as shown in FIG. 3(a). Each sync block is structured as shown in FIG. 3(b), and includes in order from the head of the block a sync pattern showing the beginning of the sync block, an ID, a parity for detecting reading error of the ID and an actual data. FIG. 3(c) shows the contents of the ID. The ID is an address information showing the position of the sync block on the tape, consisting of a frame number, a track number within the frame, and a sync block number within the track.

FIG. 4 shows the allocation of a frame number and a track number. In FIG. 4, the numeral shown at the lowermost part of each track indicates the track number and the numeral shown at the intermediate part thereof indicates the frame number. With ten tracks as one framer the track numbers from 0 to 9 are allocated in order for the tracks in each frame. In addition, the tracks having an even track number are A-azimuth tracks and those having an odd track number are B-azimuth tracks.

The symbol or sign shown at the uppermost part of each track is a kind of pilot signal for tracking control, which is recorded together with an information signal. A method of superposing the pilot signal on the information signal is not explained here since such is disclosed in a published European Patent Application of publication No. 0339724. Also, FIG. 3 shows the recording format before the necessary modulation for superposing the pilot signal thereon is carried out. The B-azimuth tracks have pilot signals recorded alternatively, which are different in frequency and expressed as f1 and f2, respectively, in FIG. 4. The tracks shown as a negative sign (−) in FIG. 4, which are of the even track number, that is, of the A-azimuth, have no pilot signal recorded. As a result, the tracking pilot signal has such a period that finishes one cycle by four tracks. Accordingly, the even and odd frames are different in relation between the track number and tracking pilot signal frame from each other.

Figure 5:
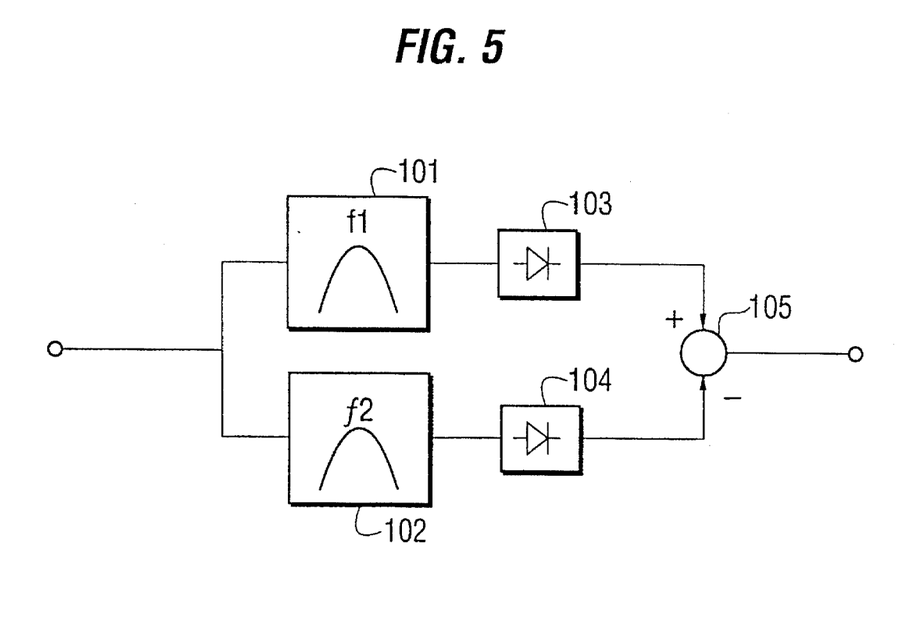
FIG. 5 is a block diagram of a tracking error detecting circuit shown in FIG. 1.

The reproduced signal from an A-azimuth head is amplified through the head amplifier 15 and sent to the tracking error detecting circuit 4. The reproduced signal thus inputted has a pilot signal leaked from the adjacent tracks in addition to the information signal of the A-azimuth head. This pilot signal is changed in magnitude in accordance with the deviation of the A-azimuth head from the A-azimuth tracks, which is used as the tracking error signal. FIG. 5 shows a block diagram of the tracking error detecting circuit. In FIG. 5, two tracking pilot components f1 and f2 contained in the reproduced signal are taken out through respective bandpass filters 101 and 102, then, their amplitudes are detected through respective AM detecting circuits 103 and 104. Thereafter a difference component (f1−f2) is calculated by a subtractor 105 to be outputted as a reproduced tracking error signal.

The reproduced tracking error signal is then inputted to the polarity switching circuit 5. Here, it is supposed that the head RA is positioned on a track with a track number 0 of an even frame. The signal HSW becomes the "H" level. Also, it is supposed that an input signal 34 from the phase correcting means 9 is fixed to the "L" level. In this case, the signal HSW passes directly through the ex-or gate 20. The switch 21 selects the lower side and the reproduced tracking error signal (f1−f2) is outputted. Further, it is supposed that the tracking control loop is set so as to have the tracking control stabilized in this state. During which, the head RB is scanning the track of track number 1. When the head LA is positioned on the track of track number 2 and the head LB is positioned on the track of track number 3 as the tape is transported along with a half rotation of the drum, the level of the signal HSW is inverted to the "L" level. As a result, the switch 20 selects the upper side, or the output side of the inverting circuit 19. However, the tracking pilot signal on the track seen from the A-azimuth head is arranged inversely to the track of track number 0, so that the tracking polarity of the output signal of the switch 21 becomes the same as that of the track of track number 0. Namely, by switching the polarity of the reproduced tracking error signal in response to the inversion of the level of the signal HSW, the tracking error signal with a constant polarity can be obtained. Consequently, by controlling the tape transportation so as to make the tracking error signal zero, the tracking control can be attained.

The tape transporting circuit 6 comprises the capstan motor 16, the speed detector 17, and the capstan motor control circuit 18, in which the capstan motor control circuit 18 controls the speed of the capstan motor 16 in response to the capstan motor rotating speed information from the speed detector 17.

Figure 6:
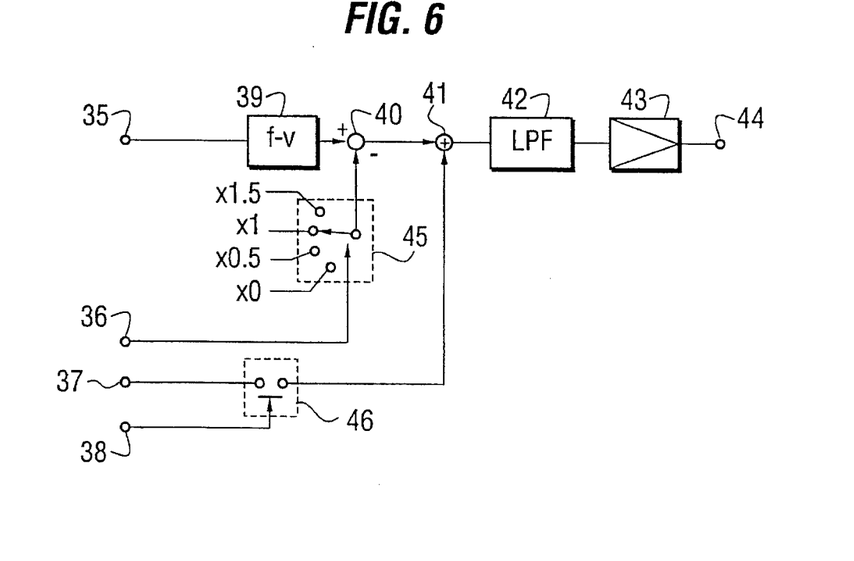
FIG. 6 is a block diagram of a capstan motor control circuit shown in FIG. 1.

FIG. 6 is a block diagram of the capstan motor control circuit 18 of the tape transporting circuit 6. The signal from the speed detector 17 is inputted to a terminal 35. The signal thus inputted has a frequency proportional to the rotating speed of the capstan motor and is subjected to frequency-voltage conversion through a frequency-voltage converter 39 to obtain a signal having a voltage according to the rotating speed of the capstan motor. A subtractor 40 subtracts a reference voltage corresponding to a target speed from this voltage to generate a speed error signal. Also, the reference voltage can be switched by a switch 45 which is operated by a signal supplied to a terminal 36. The terminal 36 receives a speed selecting signal (Vc) from the phase correcting circuit 9. In this embodiment, as shown in FIG. 6, it is supposed that a normal reproducing speed (×1) is selected. Namely, the tape is transported by four-track length in the lengthwise direction thereof by means of the capstan motor during one rotation of the drum. A terminal 37 receives the tracking error signal from the polarity switching circuit 5. The tracking error signal is sent to an adder 41 through a switch 46 operated by a control signal (TRON) from a terminal 38. Here, it is supposed that the switch 46 is closed. The adder 41 receives the speed error signal through the other input terminal thereof. These two signals are added to each other by the adder 41 and sent to a low-pass filter 42. The low-pass filter 42 applies the frequency and phase compensation necessary for controlling the capstan motor to the inputted error signal. The output signal of a driving circuit 43 is supplied to the capstan motor to drive it in response to the output of the low-pass filter 42. Thus, the tracking control can be attained as shown above.

Figure 7:
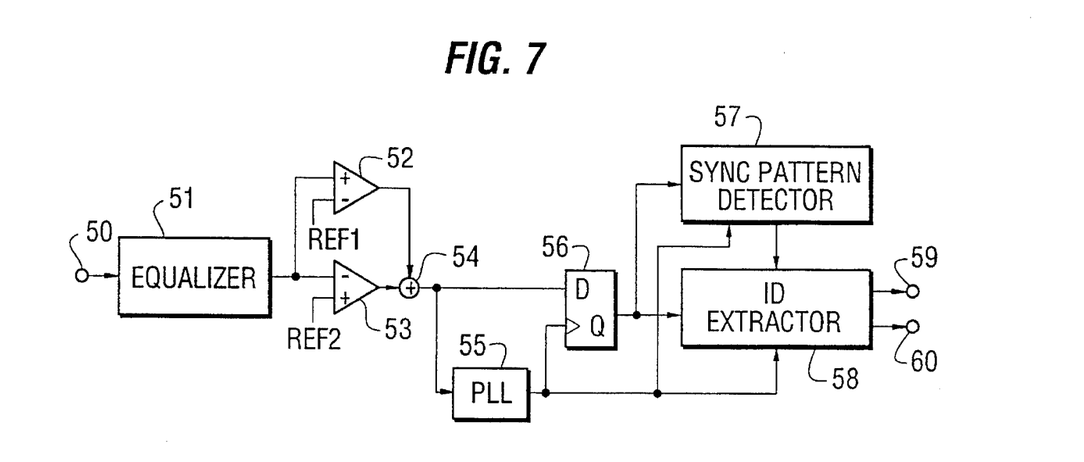
FIG. 7 is a block diagram of a track number detecting circuit shown in FIG. 1.

Next, a frame synchronizing operation will be explained below, which is broadly classified into a frame phase difference detecting operation and a correcting operation of a reproduced frame phase so as to eliminate the phase difference thus detected. First, the frame phase difference detecting operation is explained. The reproduced signal from the head amplifier 15 is also supplied to the track number detecting circuit 7. FIG. 7 shows a block diagram of the track number detecting circuit 7, which is an example of using the interleaved NRZI as a channel coding. The reproduced signal supplied to a terminal 50 is subjected to frequency characteristic compensation through an equalizer 51, then, compared through comparators 52 and 53 respectively with the reference values ref1 and ref2 to be discriminated in ternary. The output signals of the comparators 52 and 53 are logically added by an EX-OR gate 54, thus becoming a reproduced binary signal. The reproduced binary signal is supplied to a PLL circuit 55 to reproduce a clock signal therefrom. The following blocks are operated in accordance with the clock signal thus reproduced. A data latch 56 synchronizes the reproduced binary signal by the reproduced clock signal. A sync pattern detector 57 detects a sync pattern from the reproduced signal to output a signal showing a sync block forefront timing. An ID extractor 58 receives the reproduced binary signal synchronized with the signal showing the sync block forefront timing, extracts the ID information existing after a predetermined bit from the sync block forefront, and outputs the frame number after parity check to a terminal 59 as a reproduced frame number, and outputs the track number thereafter to a terminal 60 as a reproduced track identifying signal (hereinafter called reproduced track signal). In this embodiment, the reproduced track number indicates, as shown in FIG. 1, a track number detected from the A-azimuth tracks. Here, since the track number of a track reproduced by the B-azimuth heads becomes a track number of the A-azimuth head plus one, its detection is omitted. The track number has a value of 0, 2, 4, 6 or 8, however, in this embodiment, such a value that halves these values is outputted as the reproduced track number. As a result, redundant least significant bits can be eliminated when the reproduced track number is expressed by a binary digit.

Figure 8:
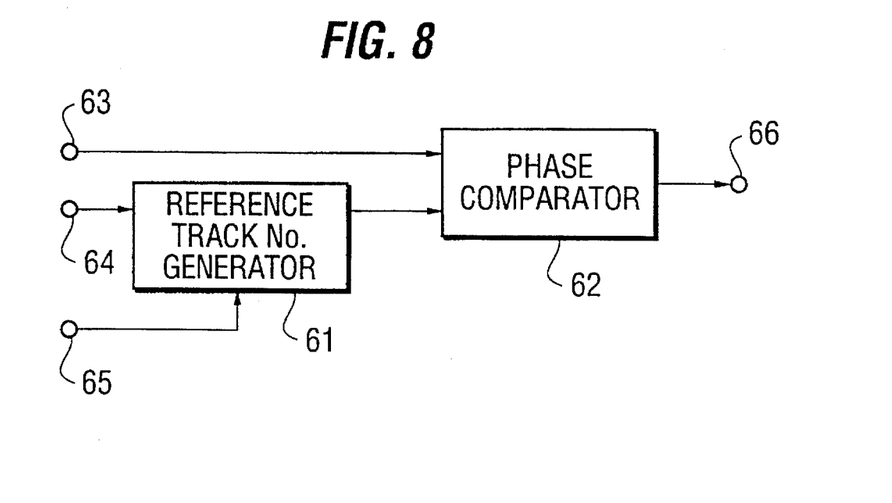
FIG. 8 is a block diagram of a frame phase difference detecting circuit shown in FIG. 1.
Figure 10:
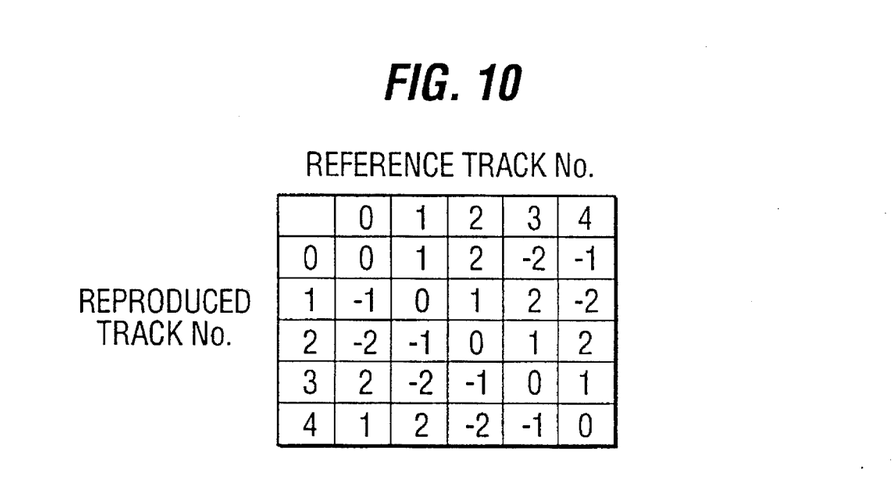
FIG. 10 is a diagram for explaining the operation of a phase comparator shown in FIG. 8.

The reproduced track number detected by the track number detecting circuit 7 is sent to the frame phase difference detecting circuit 8, in which the phase difference from that of the reference frame signal FRMR is detected. FIG. 8 is a block diagram of the frame phase difference detecting circuit 8. A terminal 63 is applied with the reproduced track number. In addition, a terminal 64 is applied with the reference frame signal and a terminal 65 is applied with the signal HSWR. A reference track number generator 61 generates a reference track number from the reference frame signal and the signal HSWR. FIG. 9 is a time chart diagram showing the state thereof, in which a shows the reference frame signal inverted for every one frame, b shows the signal HSWR and c shows that the reference track number is reset to 0 whenever the forefront of the reference frame or the reference frame signal is inverted, and that the others are incremented one by one whenever the signal HSWR is inverted. Accordingly, the reference track number generator can be realized by an up-counter having a reset input. A phase comparator 62 receives the reference track number and the reproduced track number, calculates the frame phase difference, and outputs the frame phase difference to a terminal 66. FIG. 10 shows the logic of the phase comparator 62. That is, it shows that the frame phase difference has quinary values (−2, −1, 0, 1, and 2) and when having a positive sign, the reproduced frame is delayed with respect to the reference, the unit being made of two tracks.

Figure 11:
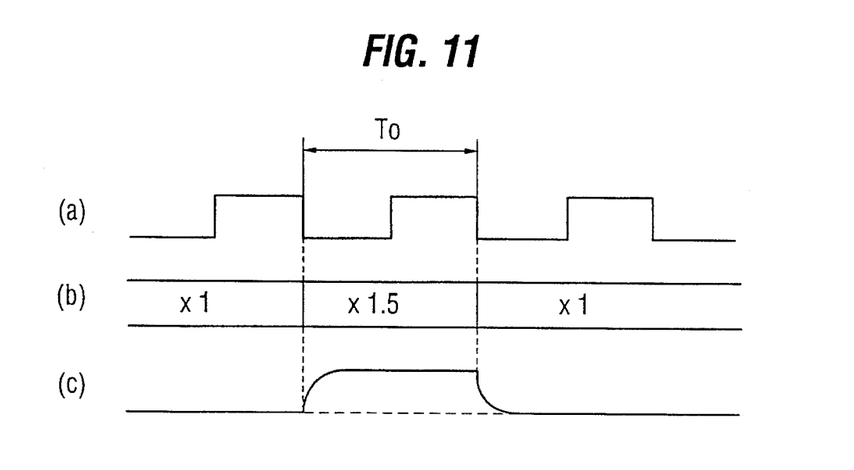
FIGS. 11 and 12 are diagrams for explaining the operation of a phase correcting circuit shown in FIG. 1.
Figure 12:
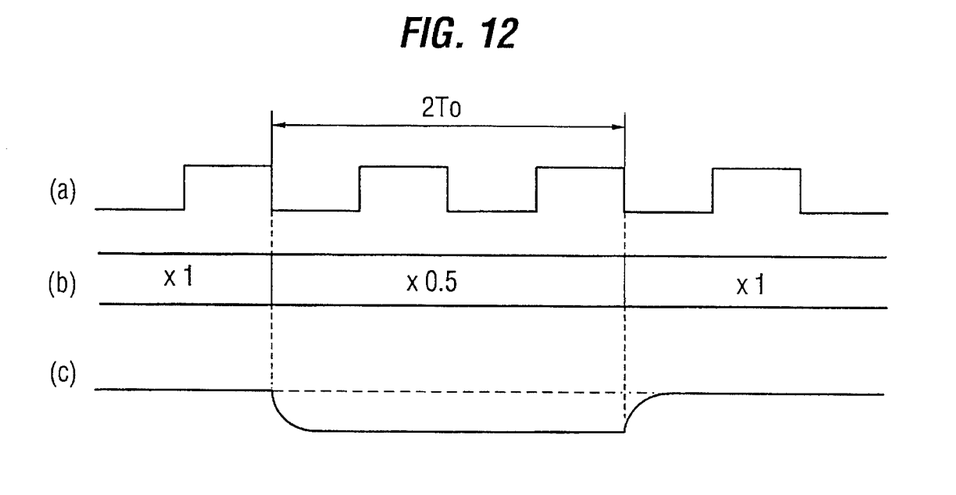

The phase correcting circuit 9 corrects the reproduced frame phase so as to make zero the frame phase difference sent from the frame phase difference detecting circuit 8. Concretely, the phase correcting circuit 9 controls the tape transporting speed by acting on the tape transporting circuit 6 to change the reproduced frame phase. Necessary processing for this is that the reproduced frame phase is corrected with respect to the reference frame phase in the two-track unit in the region of being ± four tracks. This processing will be explained by referring to FIGS. 11 and 12. In FIG. 11, a shows the signal HSWR, b shows a speed selective signal Vc sent from the phase correcting circuit 9 to the capstan motor control circuit of the tape transporting circuit 6, and c shows an actual tape speed. In the case that the switch 45 selects the normal reproducing speed (×1) as shown in FIG. 6, if the time of one period of the signal HSWR (one rotation of the drum) is expressed by T0, the tape speed is four tracks/T0. Here, if this speed is increased to a speed of being ×1.5 temporarily, the tape speed becomes six tracks/T0. By increasing the speed to the speed of being "×1.5" only for the time period of T0 shown in FIG. 11(a), the tape is further transported by two tracks in addition to the four tracks to be transported originally for the time period of T0. This means that the reproduced frame phase is advanced two tracks with respect to the reference frame. Similarly, in the case that the reproduced frame phase is advanced four tracks with respect to the reference frame, the time period of T0 may be increased to a time period of 2T0. FIG. 12 shows a method of delaying the reproduced frame phase. In this case, the tape speed is decreased from being "×1.0" to being "×0.5". As a result, the tape speed becomes two tracks/T0, so that the reproduced frame phase is delayed by four tracks for the time period of 2T0. In order to delay by two tracks, the time period during which the speed is changed may be made T0 as shown in FIG. 11.

Figure 13:
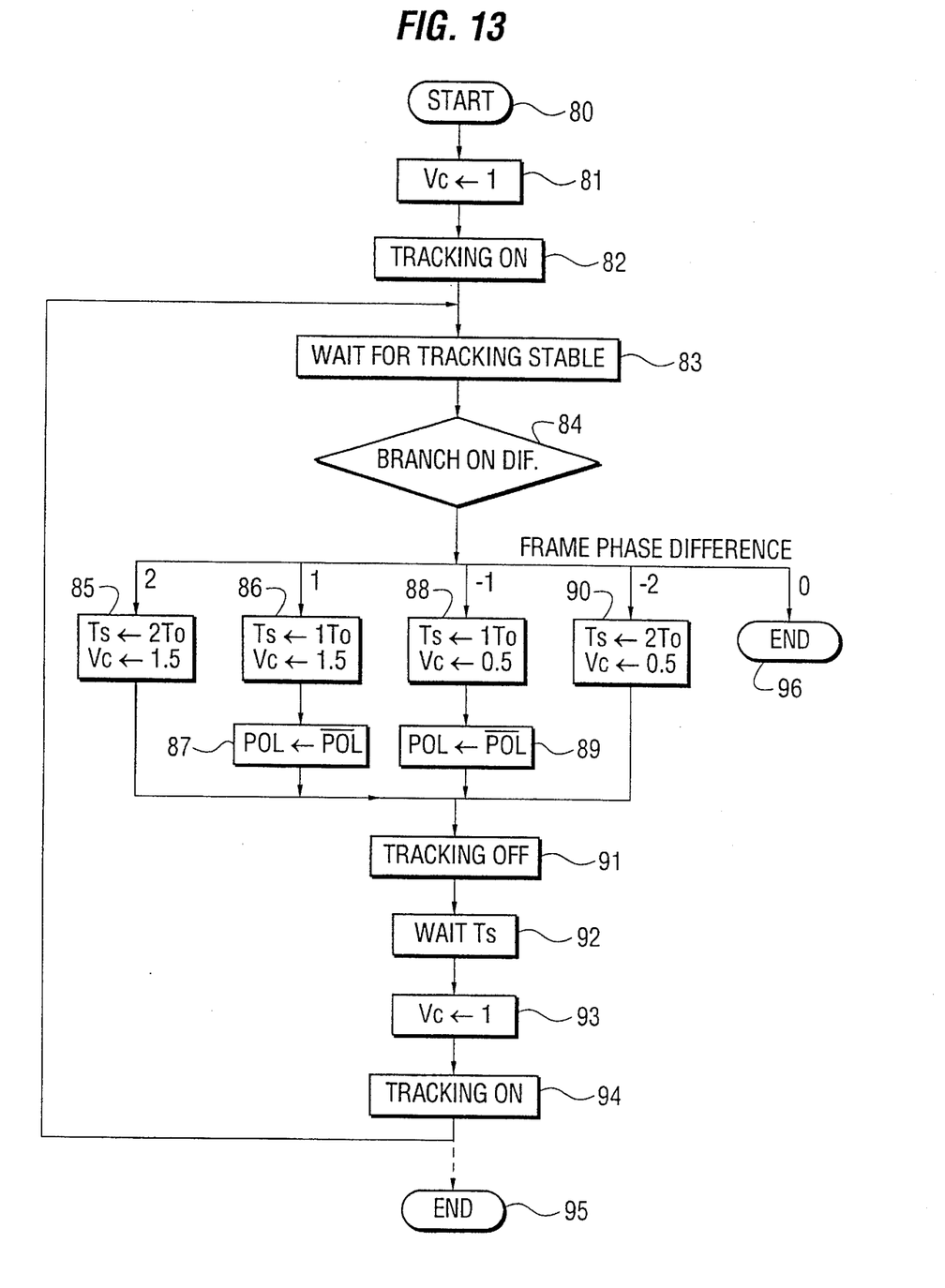
FIGS. 13 and 14 are flow diagrams for explaining the operation of the phase correcting means.

FIG. 13 shows a flow diagram for realizing the entire phase correcting process including the above-mentioned processing by means of software on a micro-processor. This process starts from a step 80 and the tracking control is stabilized from a step 81 to a step 83. The speed selective signal Vc is to be "×1" and the signal TRON is operated to make the switch 46 in FIG. 6 close. The tracking control is started under this closed condition, and waits until it is stabilized at the step 83. Concretely, it may simply wait for only a predetermined period of time in accordance with the time constant of the tracking control loop. In addition, if the frame phase difference (dif) obtained from the frame phase difference detecting circuit is monitored and is not changed for a predetermined period of time, it may be judged to be stabilized.

The steps 84 to 94 show the phase correcting operation already explained using FIGS. 11 and 12. First, the phase correcting operation is entered into the branching process at the step 84 in response to a value of the frame phase difference (dif). If the value is zero (0), the reproduced frame is synchronized with the reference frame, so that the correcting operation is not needed. This means that the process is jumped to a step 96 to be ended. If the value is not zero, it is jumped to one of the steps 85, 86, 88 and 90 in response to the value, and the speed selective signal Vc and the time period Ts during which the speed is changed are set. For example, if the value is two, the reproduced frame is delayed by four tracks with respect to the reference one. Accordingly, in order to advance the reproduced frame by four tracks, Ts and Vc are see to be 2T0 and "×1.5", respectively, at the step 85.

The steps 87 and 89 constitute a process of setting a polarity to be switched in the polarity switching circuit 5. This process is realized by operating a value (POL) of a line 34 which connects the phase correcting circuit 9 to the polarity switching circuit 5 as shown in FIG. 1. In the explanation of the tracking control, this value was made "L"

In the case when it is inverted to be made "H", the output signal of the EX-OR gate 20 becomes a signal which is an inversion of the signal HSW. Consequently, the switching phase of the switch 21 is inverted by switching the value POL between the "H" and "L" levels. As a result, the tracking error signal as the output signal of the switch 21 is inverted in polarity. At the time point when the step 83 is finished, the tracking becomes the stable state. In the case that the frame phase correction is applied for only four tracks from this stable state, the correction amount is made to coincide with the tracking pilot period and as a result, the positional relation from the head to the tracking pilot is not changed from that before correction, which means that the tracking is stable as before correction. However, in the case that two tracks are corrected, the positional relation of the tracking pilot seen from the head is inverted. Accordingly, the polarity of the tracking error signal is inverted, and thus the tracking control becomes unstable. In order to avoid this, the value POL is inverted to the value before correction when two tracks are corrected. Thus, the stabilization of the tracking control after correction can be maintained.

After finishing necessary setting processes for the correcting operation, the branched signals are collected at a step 91. The tracking control is stopped temporarily by the operation of the control signal TRON. The object of this operation is to prevent the speed control of the capstan motor from being disturbed by the tracking error signal during the correcting operation. At a step 92, correction is executed while waiting during the time period of Ts. Here, it is estimated that the time required from the branching process step 84 to the step 91 is negligibly small as compared with the time period Ts. In FIGS. 11 and 12, such a case is shown that the time period for performing the correcting operation is synchronized with the waveform of the signal HSWR, but it is not necessarily required to be synchronized therewith, and as a result, the time period during which the speed is changed may be equal thereto, and its timing is not specifically limited. The correction is completed hitherto. The speed of the capstan motor is returned to that of being ×1 at a step 93, and the tracking control is re-started using the signal TRON at a step 94. Then, the correcting operation may be ended by going directly to a step 95 as shown by the broken line. Here, the operation is returned to the step 83 for the sake of safety. The tracking control is waited to be stabilized, and it is confirmed again that the frame phase difference becomes zero, thus ending the operation at the step 96. If it does not become zero for any reason, the correcting operation is repeated again.

In addition, the tracking control polarity may be set at the step 83 using the ID information detected from the reproduced signal. In such a case, the phase correcting circuit 9 is required to have the connection lines of the reproduced frame number, the reproduced track number and the signal HSW as shown by the broken lines in FIG. 1. The signal phase relation from head to tracking pilot is discriminated by the frame number and the tracking number during reproduction and as a result, the switching polarity to be stabilized the tracking control under this state is set by means of the value POL. By being processed as above, the tracking pull-in becomes from four-track period to two-track period and the pulling time can be improved, thus leading to the reduction of the waiting time.

Also, a series of processes can be realized with the signal from a terminal 70 in FIG. 1 as a trigger. Factors of the trigger include an indication of beginning the reproduction.

In addition, when the assembly editing or the like is to be performed, if the reproduced frame is synchronized with an external frame reference of the apparatus, an external reference frame signal is inputted to an input terminal 22. The reference signal generating circuit 3 synchronizes the inputted signal using PLL or the like to generate respective signals.

Figure 14:
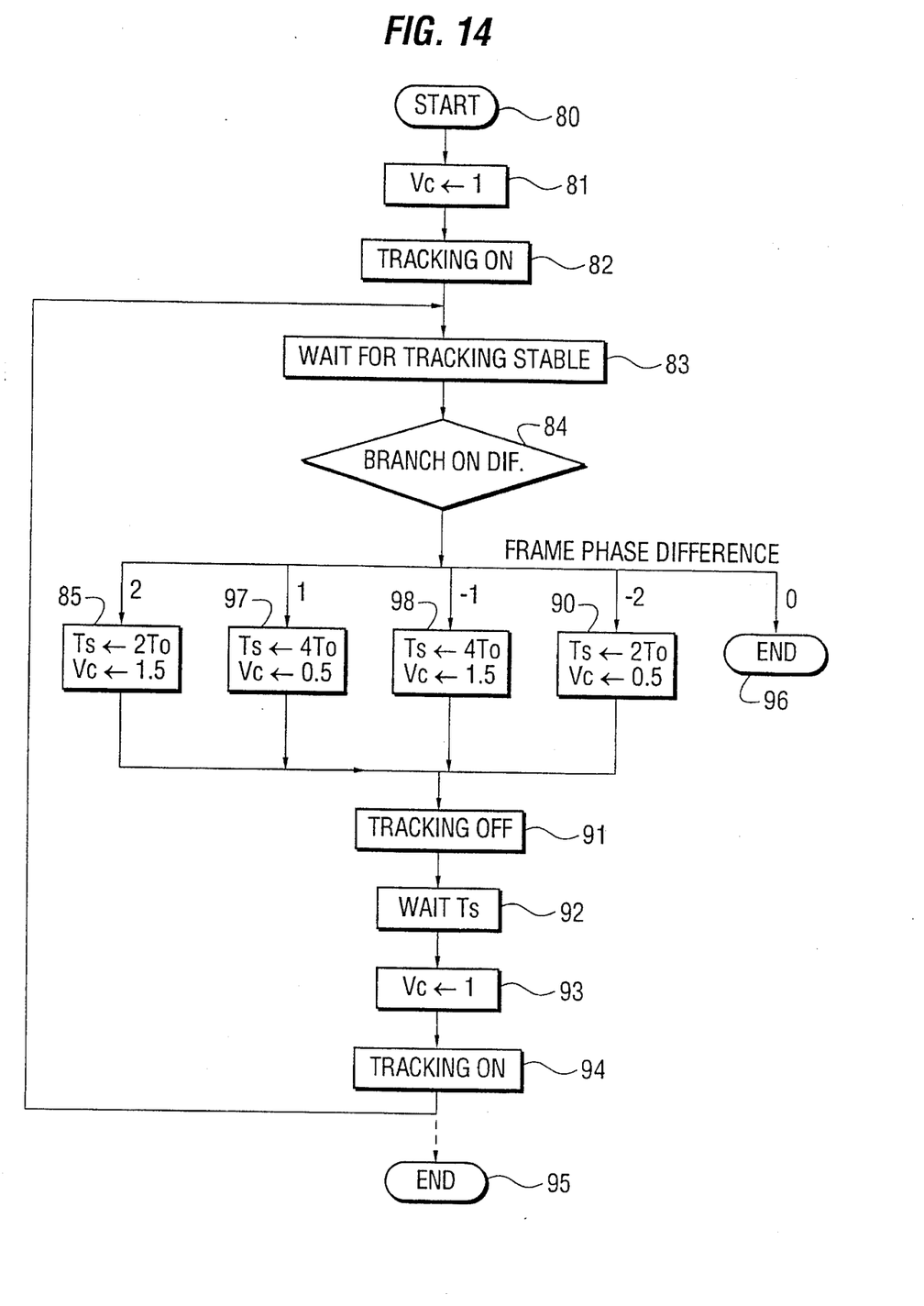

FIG. 14 is a flow diagram of a phase correcting circuit according to another embodiment of the present invention, which has the same structure as that of the preceding embodiment other than the phase correcting circuit excepting some parts described later. FIG. 14 is different from FIG. 13 in that the steps 97 and 98 are respectively provided instead of the steps 86 and 87, which have different setting values of speed and time period from those of the steps 86 and 87, and yet the steps 87 and 89 are eliminated. Explanations on the steps other than these in FIG. 14 will be omitted here because of being equal to those in FIG. 13. In the preceding embodiment, the frame synchronization was attained at the minimum correction amount by switching the tracking polarity. In this embodiment, the frame synchronization can be attained without switching the tracking polarity. In this case, two-track correction cannot be made, so that eight-track correction is made in the inverse direction of the tape instead. The frame period is made of ten tracks, and the fact that the frame synchronization is consequently attained is not different from the preceding embodiment. It is not required to set a polarity by the tracking control, so that the connection of the ex-or gate 20 and the value POL can be eliminated. This method makes it possible to perform the frame phase correction in the four-track unit. Accordingly, in the reproducing apparatus having four heads on the drum as in this embodiment, the relation between the tracking pilot and each head always becomes constant. As a result, if using a tape in which the track recording is performed while keeping the same relation from head to tracking pilot as in this embodiment, such relation will be established that the track written by oneself is always read by oneself. As a result the effect of track curving that the reproduction mechanism has can be minimized. Namely, this embodiment largely contributes to improvement of the quality (C/N) of a reproduced signal when such a mechanism that is not perfect in track linearity is used.

Also, the embodiment shown above is one example of realizing this invention, thus making a wide variety of applications possible. In these embodiments, exemplifications were made on the case that one frame is made of ten tracks and reading is performed using the drum having hour heads carried thereon. However, the present invention can be applied for clear modifications in order to respond to a difference in track pattern, head structure on the drum, tape winding angle to the drum, tracking control method or the like as well as including those shown in these embodiments.

In these embodiments, two different pilot signals were used for the sake of tracking error detection, but the invention not to be limited thereby. Four kinds of pilot signals as in 8 mm VTR may be used or a single frequency pilot signal may be recorded in divided areas in a track as in DAT.

The relation of the number of heads (m) and the number of tracks (n) is required at least to be m>n, and it is more effective if 2 m<n is satisfied.

In addition, practical signal transmission system between blocks is not limited specifically, and analog, digital, serial, parallel or multivalued signals may be employed.

Further, when recording a video signal, each frame of the recorded data may be an information unit that needs synchronization. The frame may be one picture frame. If the frame is a color-frame, the synchronization thereof is possible.

Still further, the phase correcting circuit was realized by means of software, but not limited thereto, it can be realized by means of hardware equivalent thereto. On the other hand, a part of the frame phase difference detecting circuit, the polarity switching circuit, and the tape transporting circuit may be realized by means of software.

What is claimed is:

1. A reproducing apparatus for reproducing a signal recorded on a recording tape on which a signal of one frame is segmentally recorded on n oblique tracks (n is an integer satisfying $n \geq 4$), each track of the n oblique tracks containing therein a track number indicating a position of the track in the n oblique tracks, and at least a part of the n oblique tracks containing therein a pilot signal used for a tracking control, comprising:

a tracking control loop which performs a tracking control and comprises (a) tape transporting means for transporting said recording tape in a lengthwise direction thereof, (b) m heads (m is an integer satisfying $n > m \geq 1$) which are disposed on a drum having said tape wound peripherally therearound for scanning the tracks on said tape by a rotation of the drum to obtain a reproduced signal, and (c) tracking error detecting means for detecting a positional deviation of said heads from the tracks from the pilot signal contained in said reproduced signal to output a tracking error signal indicative of the positional deviation, said tape transporting means being responsive to the tracking error signal for transporting said recording tape so as to eliminate the positional deviation;

reference signal generating means for generating a reference frame signal;

track number detecting means for detecting the track number contained in said reproduced signal to obtain a reproduced track identifying signal indicative of the track number;

frame phase difference detecting means which receives said reproduced track identifying signal and said reference frame signal for detecting a frame phase difference therebetween to obtain a frame phase difference signal indicative of the frame phase difference; and phase correcting means which receives said frame phase difference signal for controlling said tape transporting means to correct a tracking position so as to eliminate said frame phase difference;

wherein the number of tracks in the n oblique tracks forming one frame is such that a signal period of the one frame is not equal to an integral multiple of a control period of the tracking control by said pilot signal.

2. A reproducing apparatus as claimed in claim 1, wherein said reproduced track identifying signal is a code indicative of two tracks collectively.

3. A reproducing apparatus as claimed in claim 1, wherein said phase correcting means opens the tracking control loop to stop the tracking control performed by the tracking control loop during an operation of correcting the tracking position.

4. A reproducing apparatus for reproducing a signal recorded on a recording tape on which a signal of one frame is segmentally recorded on n oblique tracks (n is an integer satisfying $n \geq 4$), each track of the n oblique tracks containing therein a track number indicating a position of the track in the n oblique tracks, and at least a part of the n oblique tracks containing therein a pilot signal used for a tracking control, said apparatus comprising:

a tracking control loop which performs a tracking control and comprises (a) tape transporting means for transporting said recording tape in a lengthwise direction thereof, (b) m heads (m is an integer satisfying $n > m \geq 1$) which are disposed on a drum having said tape wound peripherally therearound for scanning the tracks on said tape by a rotation of the drum to obtain a reproduced signal, (c) tracking error detecting means for detecting a positional deviation of said heads from the tracks from the pilot signal contained in the tracks from said reproduced signal to obtain a tracking error signal indicative of the positional deviation, and (d) polarity switching means which receives said tracking error signal and performs switching between polarity inversion and non-inversion, said tape transporting means being responsive to an output signal of said polarity switching means for transporting said recording tape so as to eliminate the positional deviation;

reference signal generating means for generating a reference frame signal;

track number detecting means for detecting the track number contained in said reproduced signal to obtain a reproduced track number signal indicative of the track number;

frame phase difference detecting means which receives said reproduced track number signal and said reference frame signal for detecting a frame phase difference between said reproduced signal and said reference frame signal to obtain a frame phase difference signal indicative of the frame phase difference; and phase correcting means which receives said frame phase difference signal for controlling said tape transporting means to correct a tracking position so as to eliminate said frame phase difference and controlling said polarity switching means so as to stabilize the tracking at the tracking position after correction;

wherein the number of tracks in the n oblique tracks forming one frame is such that a signal period of the one frame is not equal to an integral multiple of a control period of the tracking control by said pilot signal.

5. A reproducing apparatus as claimed in claim 4, wherein said reproduced track identifying signal is a code indicative of two tracks collectively.

6. A reproducing apparatus as claimed in claim 4, wherein said phase correcting means opens the tracking control loop to stop the tracking control performed by the tracking control loop during an operation of correcting the tracking position.

* * * * *